US 8,393,494 B2

(12) United States Patent
Juhere

(10) Patent No.: US 8,393,494 B2
(45) Date of Patent: Mar. 12, 2013

(54) STORAGE TANK

(75) Inventor: Yannick Juhere, Cancale (FR)

(73) Assignee: Maya Group, Vilaine (FR)

( * ) Notice: Subject to any disclaimer, the term of this patent is extended or adjusted under 35 U.S.C. 154(b) by 452 days.

(21) Appl. No.: 12/602,369

(22) PCT Filed: May 21, 2008

(86) PCT No.: PCT/EP2008/056282
§ 371 (c)(1),
(2), (4) Date: Mar. 24, 2010

(87) PCT Pub. No.: WO2008/145589
PCT Pub. Date: Dec. 4, 2008

(65) Prior Publication Data
US 2011/0049141 A1     Mar. 3, 2011

(30) Foreign Application Priority Data

Jun. 1, 2007   (FR) ...................................... 07 03919

(51) Int. Cl.
*B65D 6/00*     (2006.01)
(52) U.S. Cl. ..... 220/692; 220/4.04; 220/4.12; 220/4.17; 220/4.21; 220/4.26
(58) Field of Classification Search .................. 220/4.04, 220/4.12, 4.17, 4.21, 692, 4.26, 62.11, 681, 220/693; 285/363, 910; 228/184
See application file for complete search history.

(56) References Cited

U.S. PATENT DOCUMENTS 2,592,419 A * 4/1952 Harper et al. ................. 220/4.17
3,286,870 A * 11/1966 Foelsch ......................... 220/4.12

FOREIGN PATENT DOCUMENTS

FR      2 715 385      7/1995

* cited by examiner

*Primary Examiner* — Anthony Stashick
*Assistant Examiner* — Elizabeth Volz
(74) *Attorney, Agent, or Firm* — Thorpe North & Western LLP

(57) ABSTRACT

The present invention concerns a large-volume storage vessel (100, 100'), comprising a closure section (200, 200', 200") closed by a base (210, 210', 210"), another closure section (200, 200', 200") or a base (400) and/or and at least one intermediate section (300, 300'), at least two of the adjoining components being joined to each other by a joining means (500) comprising two collars (510) produced on the annular free ends of these two components while being turned facing each other, a plurality of bolts (520) passing through the two collars (510) in order to assemble them.
According to the invention, the joining means comprises a plurality of washers (522) mounted on the screws of the bolts (520) while being interposed between the two collars (510) in order to form between them an annular volume (532) for receiving a sealing means (530).
Through this design, the various components of the vessel are assembled in an economical and nevertheless very effective manner and a space of calibrated width is provided for receiving a sealing means.

20 Claims, 9 Drawing Sheets

STORAGE TANK

Figure 1:
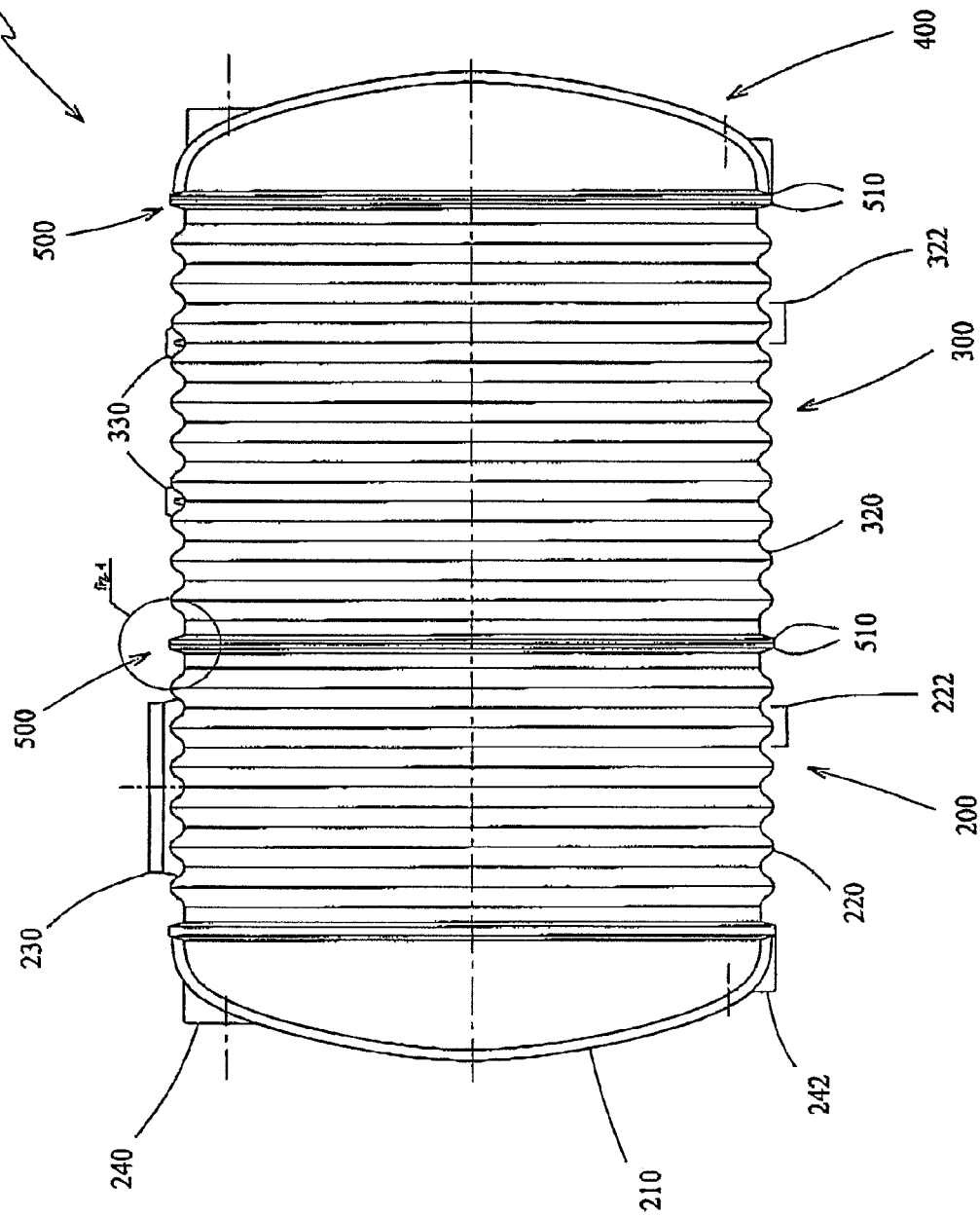

The present invention concerns a large-volume storage vessel, that is to say one the unit of measurement of which is expressed in m³. This vessel is of the type comprising a closure section closed by a base, another closure section or a base. It can also incorporate one or more intermediate sections. At least two of these adjoining components are joined to each other by a joining means.

A large-volume storage vessel is presented in particular in the patent application FR-A-2 715 385. This vessel comprises two end modules and several central modules assembled mutually. Each module has overall a cylindrical cross section while being provided at its free end or at its two free ends, depending on whether it is an end module or a central module, with a collar adapted to cooperate with a collar of another module in order to sealingly assemble these two modules together. A metal annular profile having a T-shaped cross section is interposed between two adjoining collars. The radial ring of this profile, and the collars, have holes passing through them in which fixing bolts are mounted. A welding bead, deposited by extrusion, internally fills in the residual space between the two collars, left vacant by the radial wing of the profile. By applying an electrode of a inspection appliance to the annular profile and running over the welding bead with a second electrode, it is possible to reveal the slightest crack between the inside of the vessel and the annular profile by the production of an electric arc able to be generated by the inspection appliance. In this way the impermeability of the vessel is checked.

The applicant has sought to simplify the construction of such a vessel by making it less expensive to manufacture and seeking to obtain improved impermeability of the vessel over time.

To this end, a large-volume storage vessel is proposed, comprising a closure section closed by a base, another closure section or a base and/or and at least one intermediate section, at least two of the adjoining components being joined to each other by a joining means comprising two collars produced on the annular free ends of these two components while being turned facing each other, a plurality of bolts passing through the two collars in order to assemble them. According to the invention, the joining means comprises a plurality of washers mounted on the screws of the bolts while being interposed between the two collars in order to form between them an annular volume for receiving a sealing means.

By this construction, the various components of the vessel are assembled in an economical and nevertheless very effective manner, and a space of calibrated width is provided for receiving a sealing means.

According to an additional feature of the invention, the sealing means consists of a bead of a material identical to that of the two components and which is deposited by extrusion from the inside of the vessel in the annular volume.

The application of this bead from the inside of the vessel is deeply insinuated in the annular volume and covers the internal rims of the two collars, thus procuring a perfectly sealed barrier between the inside and outside of the vessel.

According to an additional feature of the invention, the vessel incorporates an element intended, in cooperation with an inspection appliance, to determine the quality of the sealing means.

Any defects in the sealing means that are not detectable to the eye can thus be revealed.

According to an additional feature of the invention, the element consists of a metal ring placed in the annular volume, outside the sealing means.

By moving a sensor of an inspection appliance over the sealing means, it is possible to check the echo emitted by the metal ring in order to asses the quality of the welding bead.

According to an additional feature of the invention, a gasket is housed in the annular volume, outside the sealing means.

By placing an additional sealing gasket between the two collars, it is possible to overcome any failure of the main gasket.

According to an additional feature of the invention, the gasket is held captive between two recesses formed opposite each other respectively in the end faces of the two collars.

This gasket is advantageously manufactured by extrusion in an elastomer material and then cut to length.

According to an additional feature of the invention, the metal ring is interposed between the gasket and the sealing means.

In this way it is possible to place the metal ring against the gasket in order to position it precisely in order to obtain optimum functioning of the appliance for inspecting the welding bead.

According to an additional feature of the invention, at least one end section comprises a base of the dished type.

According to an additional feature of the invention, the end section and/or the intermediate section comprise externally fixing supports for stays.

According to an additional feature of the invention, an end section comprises a base of the flat type.

The features of the invention mentioned above, as well as others, will emerge more clearly from a reading of the following description of an example embodiment, the said description being given in relation to the accompanying drawings, among which:

FIG. 1 shows a side view of a vessel including an end section, an intermediate section, and a base closing off the intermediate section according to the invention.

Figure 2:
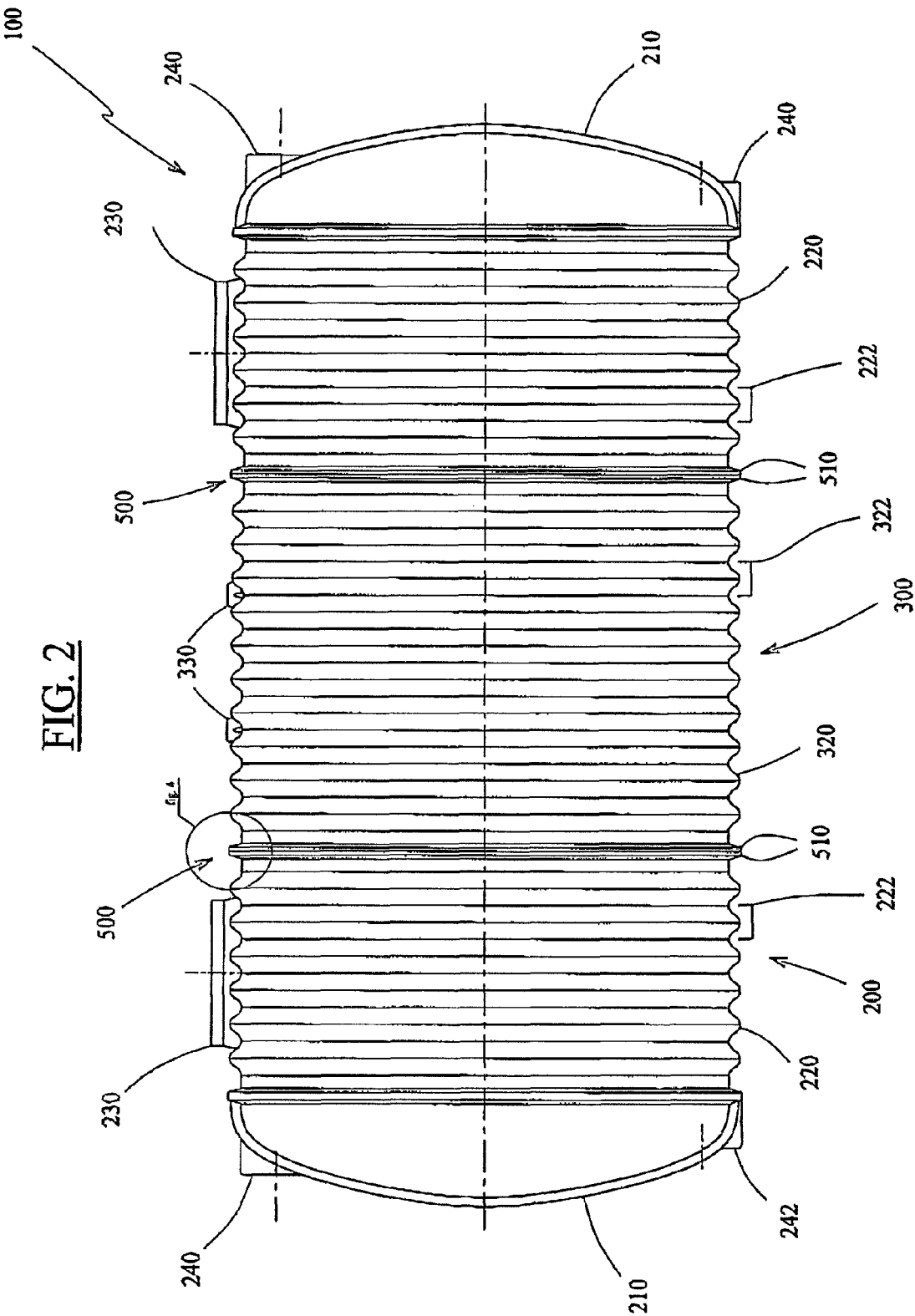
Figure 3:
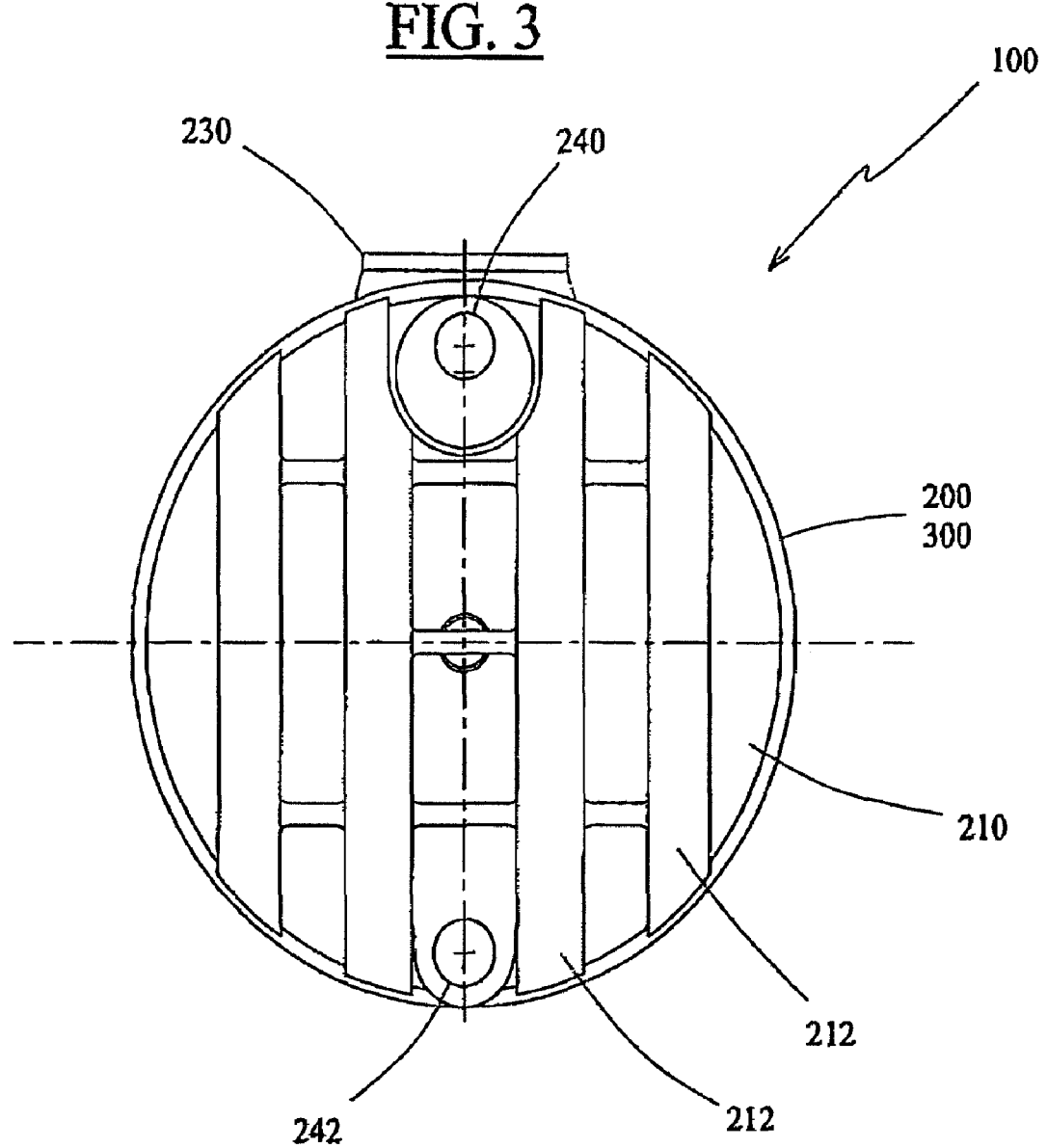
Figure 4:
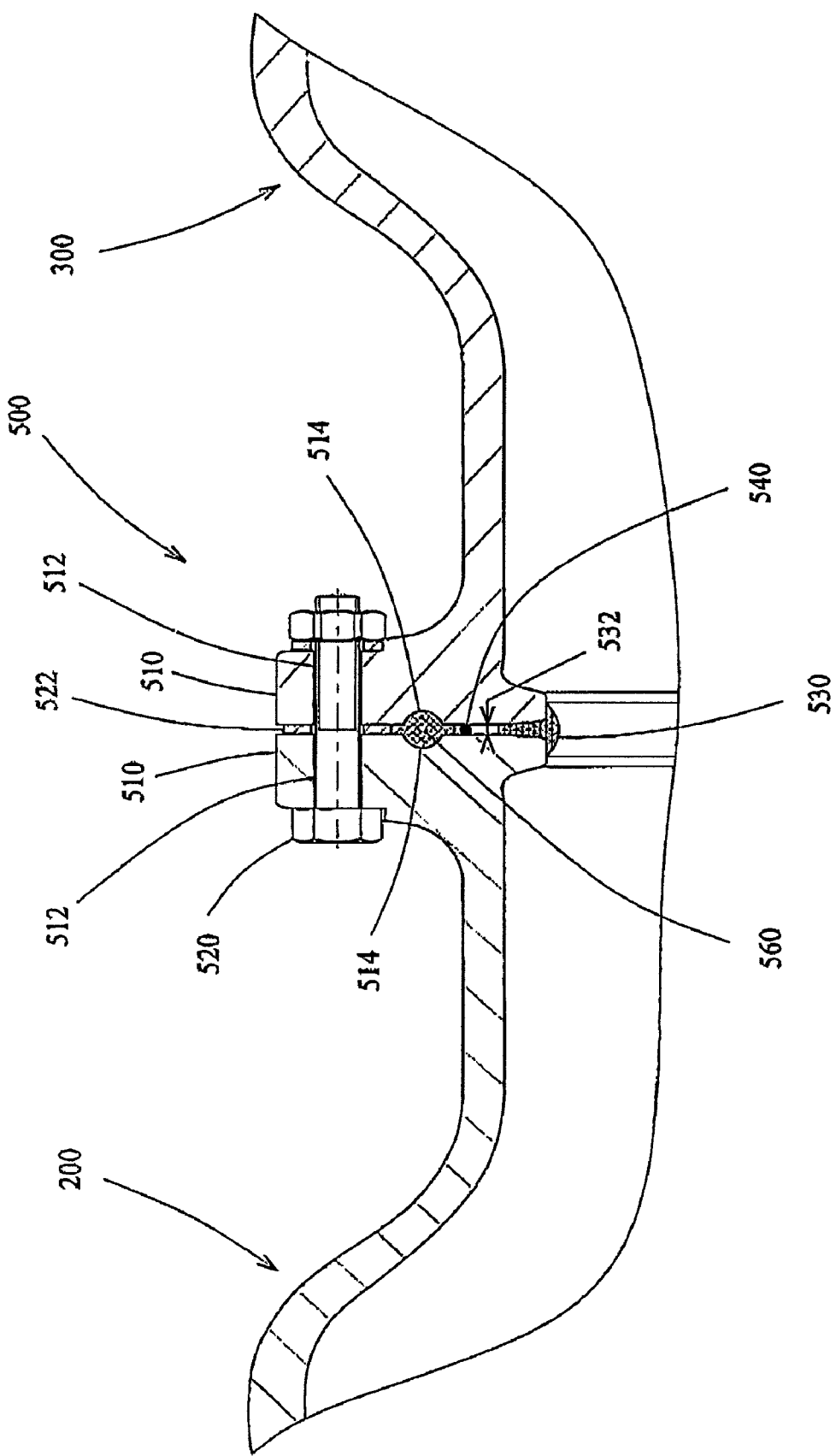
Figure 5:
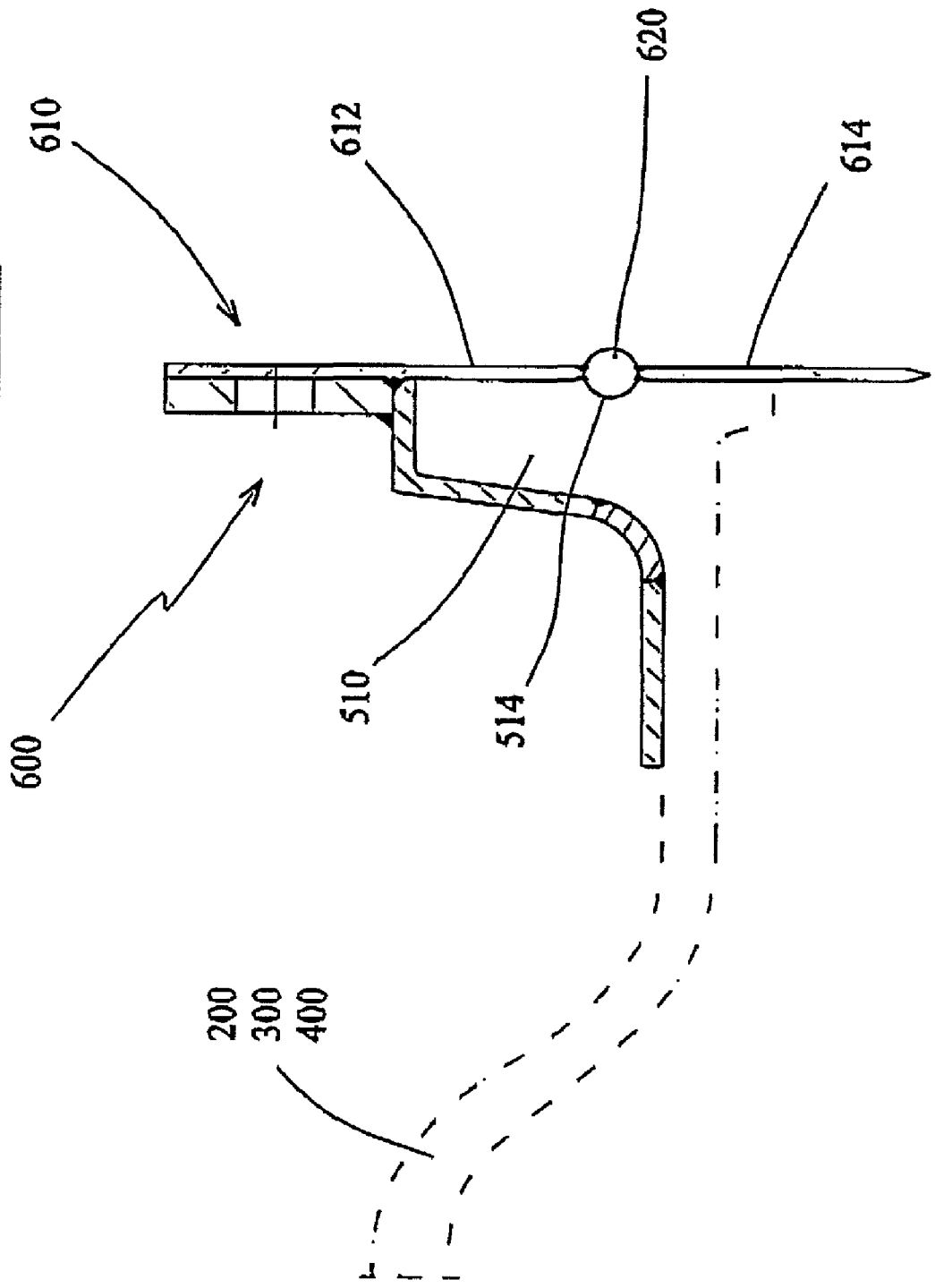
Figure 6:
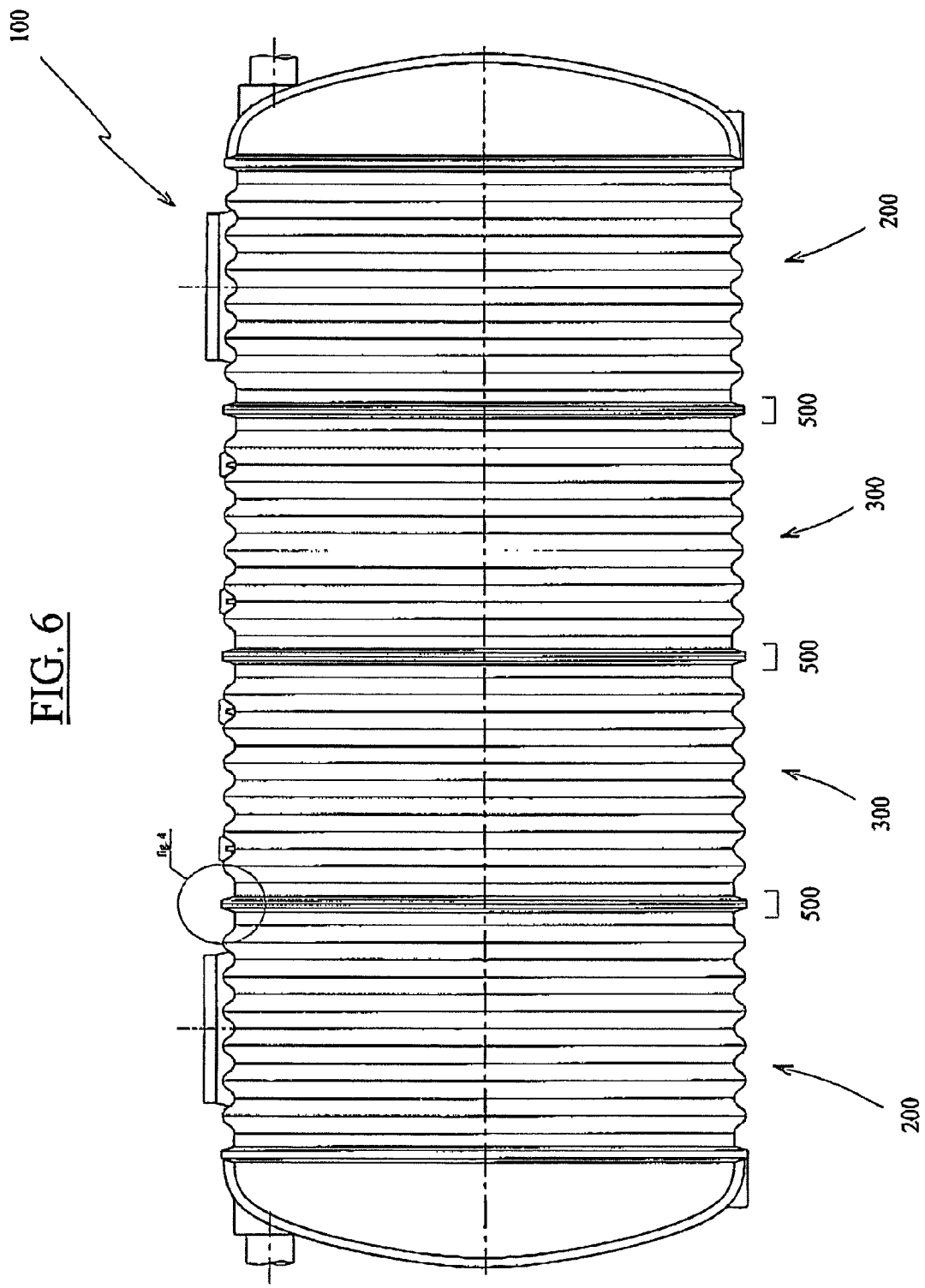
Figure 7:
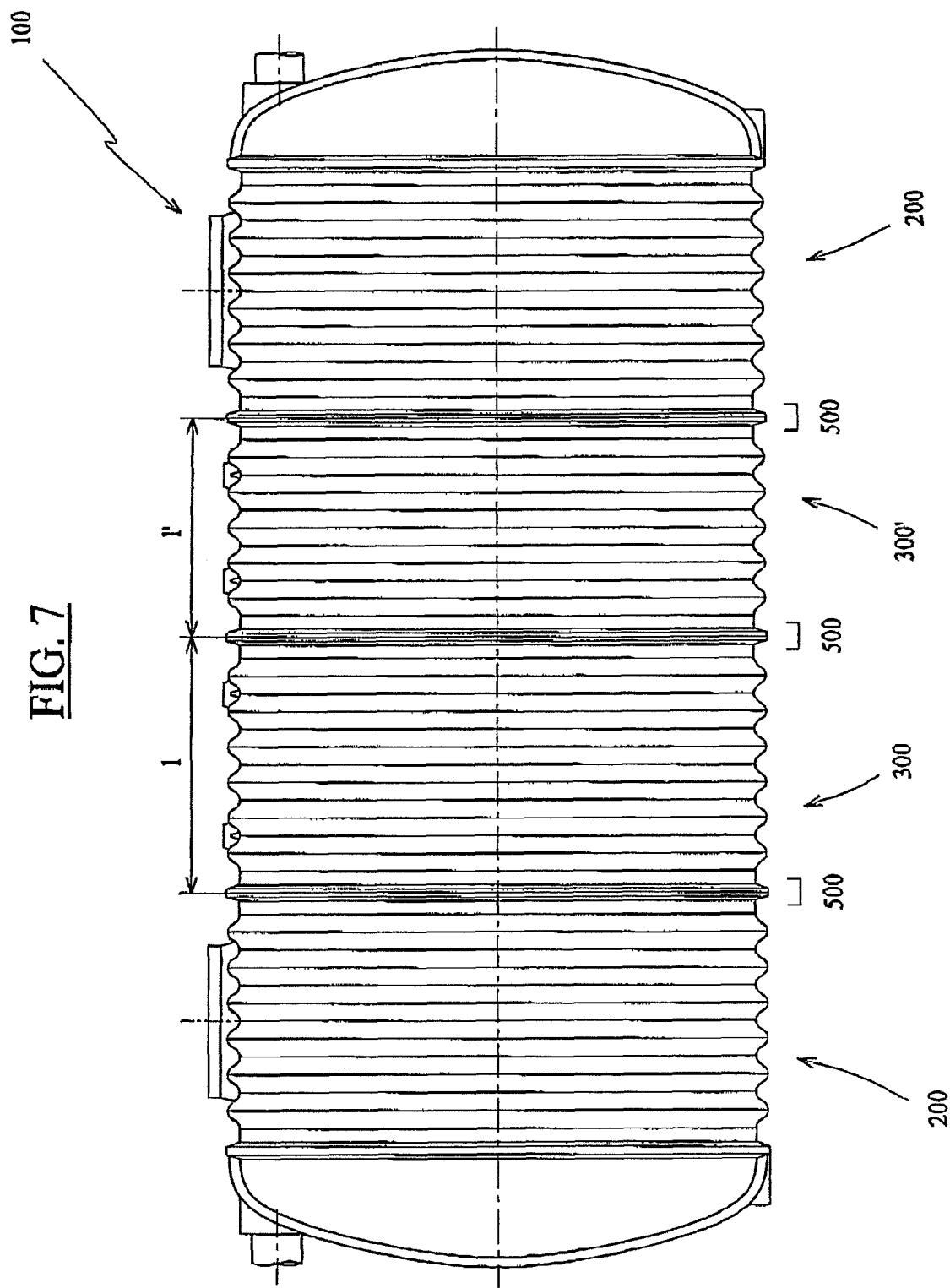

FIG. 2 shows a side view of a vessel including an end section, an intermediate section and another end section according to the invention, FIG. 3 shows an view of a vessel according to the invention, FIG. 4 shows a view in detail of an assembly of two sections of a vessel according to the invention, FIG. 5 shows a tool intended to form, in a manufacturing mould, a collar on a section or on a base for a vessel according to the invention, FIG. 6 shows a side view of a vessel including an end section, two intermediate sections and another end section according to the invention, FIG. 7 shows a side view of a vessel including an end section, two intermediate sections with different volumes and another end section according to the invention.

Figure 8:
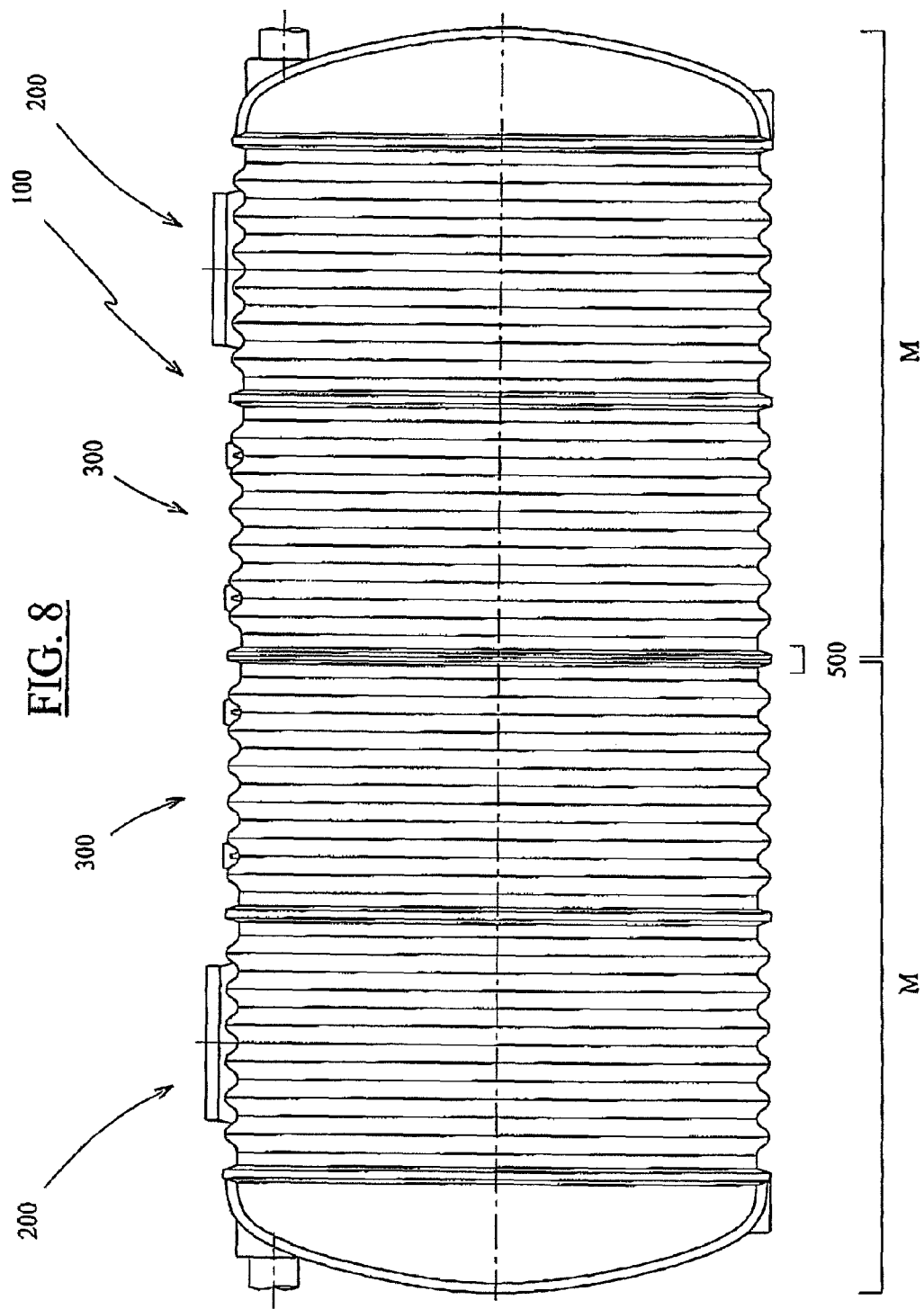
Figure 9:
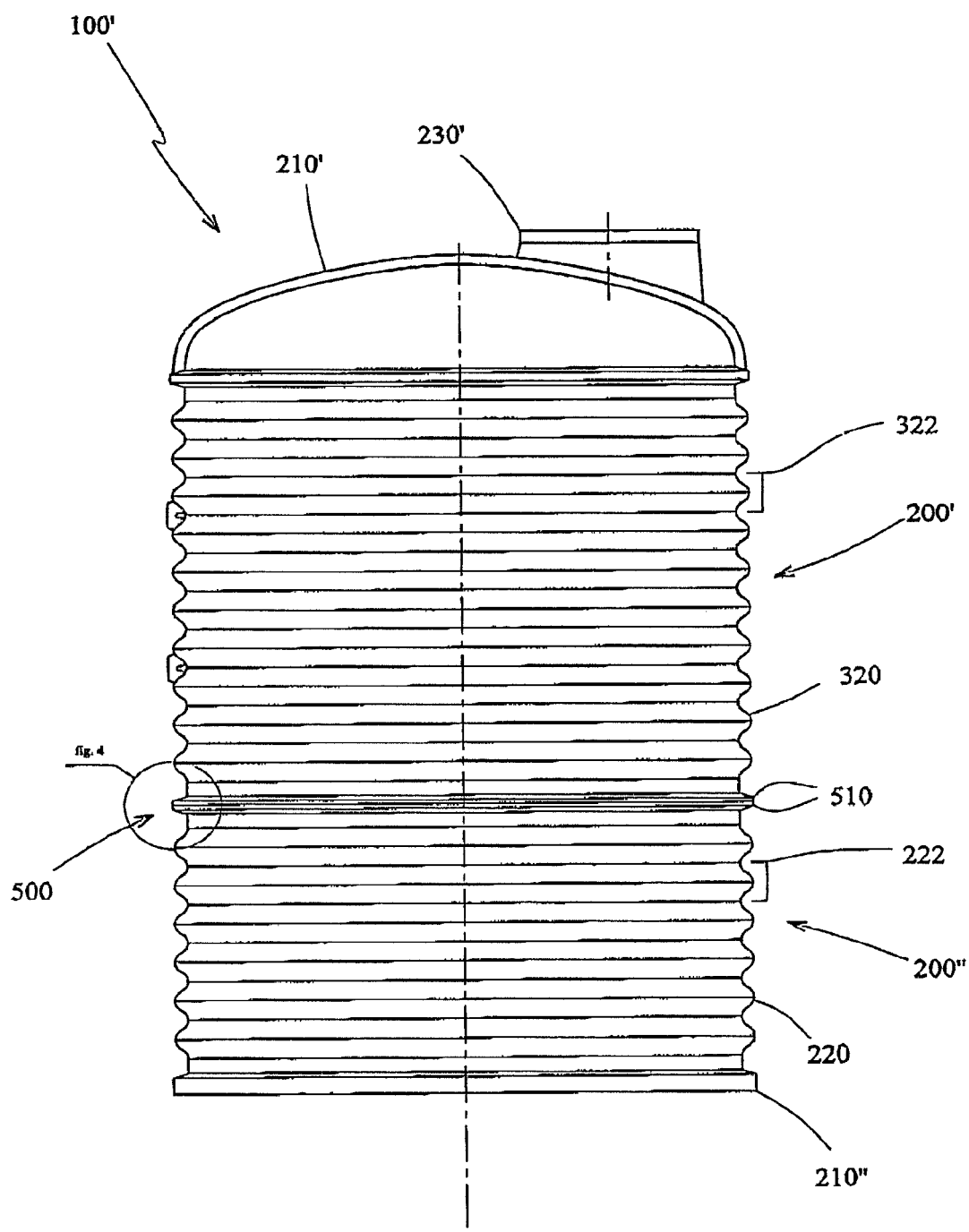

FIG. 8 shows a side view of a vessel including two modules, each module, manufactured in a single piece, including an end section and an intermediate section according to the invention, and FIG. 9 shows a side view of a variant embodiment of a vessel according to the invention.

The vessel 100, which is presented in FIG. 1, is a large-volume storage vessel, the capacity of which may be as much as several tens of m³.

It is intended for many applications such as containing chemical products, hydrocarbons or food products. It is also suitable for collecting effluent water, or for storing rainwater. It can also be used as a separation or settling vessel.

The vessel 100 comprises essentially, in this FIG. 1, an end section 200 closed by a dished base 210, at least one intermediate section 300 up against the end section, and a base 400 closing the intermediate section and which in this FIG. 1 is a dished base. This vessel is of the horizontal type, that is to say this vessel is intended to rest horizontally on the ground or to be buried in this position.

The various sections and the base are advantageously manufactured by a rotational moulding process, a process enabling a fluid plastics material to adapt to the internal walls of a mould or of a heated set of moulds and which is rotated. The material used for manufacturing these constituents is preferentially polyethylene or polypropylene.

The end section 200 comprises a peripheral wall 220, for example cylindrical, open on one side and closed on the other by a dished wall, closing one, 210, of the bases of the vessel. The peripheral wall 220 has in longitudinal section a succession of undulations 222 for procuring sufficient mechanical strength for the vessel when it is filled. The end section 200 is fabricated in a single piece.

In FIG. 3, the base 210 of the peripheral wall 220 is provided, for the same purpose, with ribs 212 for stiffening its structure.

In FIGS. 1 and 3, an opening 230, of the manhole type, passes through the peripheral wall of the end section 200. Orifices 240, 242 for connection of the vessel 100 pass through the base 210.

In FIG. 1, the intermediate section 300 also comprises a peripheral wall 320 provided with undulations 322 like the end section 200.

An opening of the manhole type may also be provided and comprise hooks, not shown, to enable it and the vessel 100 to be handled.

To take up the vertical forces undergone by the vessel when it is buried, at least one of the sections and here the intermediate section 300 comprise externally supports 330 on which stays can be fixed for taking up the loads exerted by the ground on the vessel.

In FIG. 2, the vessel 100, with a capacity greater than the one in FIG. 1, comprises a first end section 200, an intermediate section 300 and a second end section 200 turned in the opposite direction to the first.

A joining means 500 joins the two sections 200 and 300. Another joining means 500 also joins the intermediate section 300 and the base 400 (FIG. 1) or the intermediate section 300 with the other end section 200 (FIG. 2).

In FIG. 4, the joining means 500 comprises two radial collars 510, produced respectively on the free annular ends of the sections 200 and 300, projecting towards the outside of the vessel, an assembly means 520 for joining the two collars positioned facing each other in order to mutually assemble the two sections, a sealing means 530 fitting in an annular volume 532 existing between the two collars, and an element 540 intended, in cooperation with an inspection appliance, to determine the quality of the sealing means 530.

It will be noted in FIG. 1 that the end section 200 and the bottom 400 are provided respectively with a single collar 510 on their single annular end whereas the intermediate section 300 has two of them, that is to say one on each annular end.

In FIG. 4, the assembly means 520 consists of a plurality of bolts distributed at the periphery of the collars and which are housed in holes 512 passing through the two collars. To make best use of the annular volume 532 between the two collars, in particular to place the sealing means 530, a washer 522 is placed on the screw of each bolt, being interposed between the two collars 510.

The sealing means 530 is advantageously formed by a bead of a material identical to that of the sections 200, 300 and the bottom 400 and which is deposited by extrusion, for example by means of an extruder, in the annular volume 532 and on the inside of the vessel. During its deposition, the bead is insinuated deeply in the annular volume 532 and covers the internal rims of the two collars, thus procuring a perfectly sealed barrier between the inside and outside of the vessel.

In order to ensure that the welding bead is perfectly continuous or does not incorporate air bubbles liable to compromise its impermeability, a ring 540, consisting of a metal wire, is placed in the annular volume 532, before the bead 530 is deposited. It is thus possible to check, by means of an appliance, for example an appliance generating ultrasound and which is connected to a sensor, the echo emitted by the ring 540 by moving the sensor over the welding bead 530 in order to assess the quality thereof.

The presence in particular of bubbles inside the bead, not detectable to the naked eye, is revealed by this inspection.

In order to procure an irreproachable level of impermeability of the vessel, it is possible to provide, in addition to the welding bead 530, a gasket 560 which it is necessary to place in the annular volume 532, before the ring 540 is positioned and the bead 530 is deposited.

This gasket 560, of constant cross section, is manufactured from an elastomer. It is cut to length and then placed between two recesses 514 formed respectively on the end faces of the two collars 510. The gasket in this figure has a circular cross section and each recess 514 is formed by a semicircular groove. This gasket 560 could in particular act in the event of failure of the welding bead 530.

The manufacture of this recess, and more generally of the collar, is implemented by a tool 600 presented in FIG. 5 and which can be adapted to a mould for fabricating a section or several sections or a base. This tool must be mounted at the end of the mould. It thus comprises a ring 610 intended to form the end face of the collar 510 and which is fixed for example by welding to the fabrication mould. This ring 610 consists of an external ring 612, an internal ring 614, joined by a torus 620, interposed between them, and which is intended to form the recess 514 for the gasket.

When this gasket 560 is present, as is clear in FIG. 4, it is advantageous to place the ring 540 against the gasket 560 in order to position it at a constant distance from the internal rims of the two collars 510, in order to obtain optimum functioning of the appliance for inspecting the welding bead 530.

It will be noted in FIG. 1 that the joining means 500 between the intermediate section 300 and the base 400 is of the same type as that existing between the two sections 200 and 300.

In addition, one or more other intermediate sections can be incorporated in the construction of the vessel in order to increase the capacity thereof. In FIG. 6, two intermediate sections 300 with the same capacity, a first end section 200 and a second end section 200 make up the vessel 100. A joining means 500, such as the one that has just been described, then joins each end section 200 with an adjoining intermediate section 300 and the two intermediate sections 300.

In FIG. 7, the length l' of the second intermediate section 300' is less than the length, l, of the first intermediate section 300, thus procuring for them two different capacities in order, in combination, to offer vessels in an extended capacity range.

According to the volume of the vessel that it is wished to produce, it is possible to associate an end section with an intermediate section not with a joining means but by manufacturing them together in two adapted moulds that are associated for manufacturing them by rotational moulding. It is thus possible to manufacture in a single piece a module M comprising an end section associated with an intermediate section, as is clear in FIG. 8. It may be advantageous to use such a module for eliminating a joining means. In fact, in this FIG. 8, a single joining means 500 is used to connect two modules each comprising an end section and an intermediate section.

The vessel presented in FIGS. 1, 2, 6, 7 and 8 is a vessel of the horizontal type. A vessel 100' of the vertical type is presented in FIG. 9, that is to say a vessel that is intended to rest vertically on the ground, for example when the minimum footprint on the ground is sought. The vessel comprises here two end sections 200', 200" joined by a joining means 500. The opening 230', of the manhole type, here passes through the bottom wall 210' of an end section 200', that is to say a high part of the vessel 100'. The other end section 200" incorporates here a flat bottom 210" to procure a stable seat for the vessel 100' on the ground.

The construction of a vessel 100 or 100' of the invention is as follows. The constituents fabricated by rotational moulding are preassembled on a flat horizontal assembly bench, not shown. The vessels 100 of the horizontal type, or 100' of the vertical type, are constructed horizontally on this bench.

The end sections 200, 200' or 200", the intermediate section or sections 300, 300' and, where applicable, the base 400 in replacement for an end section 200, 200' or 200", are placed in an alignment position, chocking them temporarily as required.

Each gasket 560 is placed in a recess 514. To make it stay therein, it is possible for this purpose to glue the reception recess in advance. The sections are then preassembled together along with, where applicable, the base with its adjoining section, with bolts 520 that are fitted in the holes 512 while placing the separating washers around the screws between two adjoining collars 510. The inspection ring 540, cut to length and possibly curved in the annular volume 532, is fitted. For assistance in placing it with precision, it can be pressed on the gasket 560. The sections and where applicable the base are then clamped by suitably tightening all the bolts 520. The following step consists of depositing a bead 530 of extruded material in the annular volume 532 existing between two adjoining collars 510 in order to sealingly weld the sections together and the bottom with its adjoining section, if such is the case. The welds are then inspected by moving, over the surface of each bead 530, the sensor of an inspection appliance functioning by the emission of ultrasonic waves in order to check the quality of the welds and thus the impermeability of the vessel. The manufacture of the vessel can be completed by installing accessories such as installing couplings or a closure cover for the manhole.

The vessel of the invention has a design that is simpler to implement and less expensive to manufacture that that known from the prior art.

Through its modular design, it is possible to construct vessels covering a wide range of capacities from standard rotationally moulded elements.

The quality of the joining of these elements procures for it a remarkable level of impermeability.

The invention claimed is:

1. Large-volume storage vessel (100, 100'), comprising an end section (200, 200', 200") closed by a base (210, 210', 210"), another end section (210, 210', 210") or a base (400) or at least one intermediate section (300, 300'), at least two of the adjoining components being joined to each other by a joining means (500) comprising two collars (510) produced on annular free ends of these two components while being turned facing each other, a plurality of bolts (520) passing through the two collars (510) in order to assemble them, characterized in that the joining means (500) comprises a plurality of washers (522) mounted on screws of the bolts (520) while being interposed between the two collars (510) in order to form between them an annular volume (532) for receiving a sealing means (530), the sealing means including a bead of a material identical to that of the two components and which is deposited by extrusion from the inside of the vessel in the annular volume (532).

2. Vessel (100) according to claim 1, characterized in that at least one end section (200) comprises a base (210) of the dished type.

3. Vessel (100) according to claim 1, characterized in that the end section (200) and/or the intermediate section (300, 300') comprises externally fixing supports (330) for stays.

4. Vessel (100) according to claim 1, characterized in that an end section (200") comprises a base (210") of the flat type.

5. Vessel (100, 100') according to claim 1, characterized in that it incorporates an element (540) intended, in cooperation with an inspection appliance, to determine the quality of the sealing means (530).

6. Vessel (100, 100') according to claim 5, characterized in that the element (540) consist of a metal ring placed in the annular volume (532) outside the sealing means (530).

7. Vessel (100, 100') according to claim 6, characterized in that a gasket (560) is housed in the annular volume (532), outside the sealing means (530).

8. Vessel (100, 100') according to claim 7, characterized in that the gasket (560) is held captive between two recesses (514) formed opposite each other respectively in the end faces of the two collars (510).

9. Vessel (100, 100') according to claim 7, characterized in that the metal ring (540) is interposed between the gasket (560) and the sealing means (530).

10. A vessel, comprising:
a) components including a end section closed by a base, and another end section or a base or an intermediate section;
b) at least two adjoining components being joined to each other by collars on annular free ends of the adjoining components;
c) a plurality of bolts passing through the collars;
d) a plurality of washers mounted on the plurality of bolts and interposed between the collars to form an annular volume between the collars; and
e) a seal including a bead of a material of the two adjoining components deposited in the annular volume.

11. The vessel of claim 10, wherein at least one end section includes a dish base.

12. The vessel of claim 10, wherein an end section includes a flat base.

13. The vessel of claim 10, wherein the end section, or the intermediate section, or both, comprises externally fixing supports for stays.

14. The vessel of claim 10, further comprising a gasket housed in the annular volume outside the seal.

15. The vessel of claim 14, wherein the gasket is held between two recesses formed opposite each other respectively in end faces of the two collars.

16. The vessel of claim 10, further comprising a metal ring placed in the annular volume outside the seal.

17. The vessel of claim 16, further comprising a gasket housed in the annular volume outside the seal.

18. The vessel of claim 17, wherein the gasket is held between two recesses formed opposite each other respectively in end faces of the two collars.

19. The vessel of claim 17, wherein the metal ring is interposed between the gasket and the seal.

20. A vessel, comprising:
a) components including a closure section closed by a base, and another closure section or a base or an intermediate section;
b) at least two adjoining components being joined to each other by collars on annular free ends of the adjoining components;
c) a plurality of bolts passing through the collars;
d) a plurality of washers mounted on the plurality of bolts and interposed between the collars to form an annular volume between the collars;
e) a bead of a material of the two adjoining components deposited by extrusion from the inside of the vessel in the annular volume;
f) a gasket housed in the annular volume outside the seal;
g) the gasket being held between two recesses formed opposite each other respectively in end faces of the two collars; and
h) a metal ring placed in the annular volume outside the seal, and interposed between the gasket and the seal.

* * * * *